(12) United States Patent
Rissanen

(10) Patent No.: US 8,799,986 B2
(45) Date of Patent: Aug. 5, 2014

(54) SYSTEM AND METHOD FOR CONTROLLING POLICY DISTRIBUTION WITH PARTIAL EVALUATION

(75) Inventor: Erik Rissanen, Kista (SE)

(73) Assignee: Axiomatics AB, Kista (SE)

( * ) Notice: Subject to any disclaimer, the term of this patent is extended or adjusted under 35 U.S.C. 154(b) by 482 days.

(21) Appl. No.: 12/775,039

(22) Filed: May 6, 2010

(65) Prior Publication Data

US 2010/0325692 A1    Dec. 23, 2010

Related U.S. Application Data

(60) Provisional application No. 61/213,118, filed on May 7, 2009.

(51) Int. Cl.
*H04L 29/06* (2006.01)

(52) U.S. Cl.
USPC .................................. 726/1; 726/27; 713/182

(58) Field of Classification Search
CPC ................................ H04L 63/10; G06F 21/10
USPC ............................................................. 726/1
See application file for complete search history.

(56) References Cited

U.S. PATENT DOCUMENTS

| | | | |
|---|---|---|---|
| 2001/0023421 A1* | 9/2001 | Numao et al. | 707/9 |
| 2005/0166260 A1* | 7/2005 | Betts et al. | 726/4 |
| 2006/0041666 A1 | 2/2006 | Karremans | |
| 2006/0191017 A1* | 8/2006 | Hieda | 726/27 |
| 2006/0200664 A1 | 9/2006 | Whitehead et al. | |
| 2007/0192839 A1 | 8/2007 | Fee et al. | |
| 2008/0184336 A1 | 7/2008 | Sarukkai et al. | |
| 2009/0228951 A1 | 9/2009 | Ramesh et al. | |
| 2012/0066739 A1 | 3/2012 | Rissanen | |

FOREIGN PATENT DOCUMENTS

| | | |
|---|---|---|
| EP | 1927930 | 6/2008 |
| WO | WO 2005/009003 | 1/2005 |
| WO | WO 2008/046227 | 4/2008 |

OTHER PUBLICATIONS

Samarati et al., "Access Control: Policies, Models, and Mechanisms", FOSAD, pp. 137-196, 2001.*
International Search Report for PCT/SE2009/00139, mailed Oct. 26, 2009.
International Search Report for PCT/SE2010/050035, mailed Aug. 12, 2010.
Written Opinion of the International Searching Authority for PCT/SE2010/050035, mailed Aug. 12, 2010.
International-Type Search Report for ITS/SE2009/00139, mailed Oct. 26, 2009.
U.S. Appl. No. 13/318,886, (Rissanen) filed Nov. 4, 2011.

* cited by examiner

*Primary Examiner* — Mohammad L Rahman
(74) *Attorney, Agent, or Firm* — Nixon & Vanderhye PC

(57) ABSTRACT

A system controls policy distribution with partial evaluation to permit/deny access to protected alternatives. The system includes a database to store access control policy functions for protected alternatives, a guard to guard access to a protected alternative and construct an access control request including attributes regarding the protected alternative, a policy decider to receive the access control request from the guard, a policy distributor connected to the database and policy decider, to collect the static attributes of the protected alternative, and send them to the policy distributor, which constructs a partial access control request from the static attributes, performs partial evaluation against the stored access control policy function, resulting in a simplified access control policy function, and sends the simplified function to the policy decider, to evaluate access control requests regarding the protected alternative, and return a permit or deny response to the guard.

12 Claims, 3 Drawing Sheets

US 8,799,986 B2

SYSTEM AND METHOD FOR CONTROLLING POLICY DISTRIBUTION WITH PARTIAL EVALUATION

This application claims the benefit of U.S. Provisional Application No. 61/213,118, filed May 7, 2009, the entire content of which is hereby incorporated by reference.

FIELD OF THE INVENTION

The present invention relates in a first aspect to a system operable to control policy distribution with partial evaluation in order to permit/deny access to a protected means.

According to a second aspect the present invention relates to a method for controlling policy distribution with partial evaluation in order to permit/deny access to a protected means.

According to a third aspect the present invention relates to at least one computer program product for controlling policy distribution with partial evaluation in order to permit/deny access to a protected means.

BACKGROUND OF THE INVENTION

XACML is an access control policy language. In practical use of XACML a large enterprise will have many different resources and lots of policies about different resources. There is a desire to make management of the policies easy to handle.

It is desirable to centralize the machinery for policy management so it is easy to manage all the policies, rather than having lots of policies spread around all over with little control over them.

It is also desirable to make the "physical" distance between a PEP (Policy Enforcement Point) and a PDP (Policy Decision Point) short for performance reasons. Sending each request to a single central PDP in a large enterprise does not scale well. The load on the PDP will get high and the delay from the request and response in transit over a network will degrade performance.

So it is desirable to have many PDPs around, close to the resources. These many PDPs need to be managed efficiently. Each PDP must receive the right policies about those resources (or perhaps users) which they receive requests about. But at the same time it is desirable to hide this machinery of many PDPs from the administration, and present a consolidated view of the whole enterprise to the administrators.

Existing approaches to policy distribution have a lot of problems.

One approach is to distribute all policies to all PDPs. This is simple and the whole enterprise looks like a single PDP to the administrators. However, distributing all policies is inefficient, because there is an overhead in network communications sending policies which are not needed at each PDP. Each PDP will have a large set of policies to evaluate, which degrades runtime performance.

Furthermore, distributing all policies may be undesirable, because policies may be sensitive/confidential and must not be disclosed to any PDP.

Another approach is to manually decide which policies to send to which PDP. However, this represents an administrative overhead and is prone to error.

A third approach is to use a subset of XACML for control over distribution, for instance the XACML standard has a "profile" (an additional extra piece of "appendix" we could say) by which it is possible to request a policy based on matching of the top level target only. However, this represents an administrative overhead since the policies must be kept in this form. Besides, it does not allow distribution of any XACML policy, since the policies must be in a special form where the top level target is used for distribution control. Furthermore, it is prone to error.

SUMMARY OF THE INVENTION

The above mentioned problems are solved by a system operable to control policy distribution with partial evaluation in order to permit/deny access to a protected means according to Claim 1. The system comprises a storing means operable to store all access control policy functions for all protected means. The system also comprises a guard means operable to guard access to a protected means and to construct an access control request comprising attributes regarding the protected means. Furthermore, the system also comprises a policy decision means connected to the guard means and operable to receive the access control request from the guard means. The system also comprises a policy distribution means connected to the storing means, and to the policy decision means. The policy decision means is also operable to collect the static attributes of the protected means, and to send the static attributes to the policy distribution means, which in turn is operable to construct a partial access control request from the static attributes of the protected means, and to perform partial evaluation against the access control policy function stored in the storing means, resulting in a simplified access control policy function. The policy distribution means is operable to send the simplified access control policy function to the policy decision means, which in turn is operable to use the simplified access control policy function to evaluate access control requests regarding the protected means, and to return a permit/deny response to the guard means.

The main advantages with this system can be summarised in below. Policies are distributed automatically to the right resource/protected means without administrator intervention or coordination. It works for any kind of XACML policy, though some policies can be "simplified" more than others. We get a consolidated policy view for administrators for the whole enterprise. Furthermore, each PEP/guard means can get a set of resource/protected means specific policies which are located close to the PEP, and are "minimal" in that they apply only to the specific resource and all static attributes have already been calculated in the policies.

A further advantage in this context is achieved if each protected means is a resource, a subject, an action, an environment, or a combination of two or more of these alternatives.

Furthermore, it is an advantage in this context if the system also comprises an input means connected to the storing means, and operable to input a new access control policy function or to amend an access control policy function in the storing means.

A further advantage in this context is achieved if each protected means is connected to the guard means closest to the protected means.

Furthermore, it is an advantage in this context if the storing means is in the form of a database.

A further advantage in this context is achieved if the attributes are in the form of attributes which are present, attributes which are not present and attributes which are undefined.

The above mentioned problems are also solved with a method for controlling policy distribution with partial evaluation in order to permit/deny access to a protected means according to Claim 7. The method is performed with the aid of a system. The method comprises the steps:

with the aid of a policy decision means connected to a guard means, both comprised in the system, to collect the static attributes of the protected means;

to send the static attributes to a policy distribution means comprised in the system and connected to the policy decision means, and to a storing means comprised in the system and operable to store all access control policy functions for all protected means;

to construct a partial access control request from the static attributes of the protected means;

to perform partial evaluation against the access control policy function stored in the storing means, resulting in a simplified access control policy function;

to send the simplified access control policy function to the policy decision means;

with the aid of the guard means, to construct an access control request comprising attributes regarding the protected means;

to send the access control request to the policy decision means;

to use the simplified access control policy function to evaluate access control requests regarding the protected means; and to return a permit/deny response to the guard means.

The main advantages with this method can be summarised in below. Policies are distributed automatically to the right resource/protected means without administrator intervention or coordination. It works for any kind of XACML policy, though some policies can be "simplified" more than others. We get a consolidated policy view for administrators for the whole enterprise. Furthermore, each PEP/guard means can get a set of resource/protected means specific policies which are located close to the PEP, and are "minimal" in that they apply only to the specific resource and all static attributes have already been calculated in the policies.

A further advantage in this context is achieved if each protected means is a resource, a subject, an action, an environment, or a combination of two or more of these alternatives.

Furthermore, it is an advantage in this context if the method also comprises the step:

with the aid of an input means comprised in the system and connected to the storing means, to input a new access control policy function, or to amend an access control policy function in the storing means.

A further advantage in this context is achieved if the attributes are in the form of attributes which are present, attributes which are not present and attributes which are undefined.

Furthermore, it is an advantage in this context if the step to perform partial evaluation is performed by substituting the attributes which are present in the partial access control request with values into the access control policy function.

The above mentioned problems are also solved with at least one computer program product according to Claim 12. The at least one computer program product is/are directly loadable into the internal memory of at least one digital computer, and comprises software code portions for performing the steps of the method according the present invention when the at least one product is/are run on the at least one computer.

The main advantages with this computer program product can be summarised in below. Policies are distributed automatically to the right is resource/protected means without administrator intervention or coordination. It works for any kind of XACML policy, though some policies can be "simplified" more than others. We get a consolidated policy view for administrators for the whole enterprise. Furthermore, each PEP/guard means can get a set of resource/protected means specific policies which are located close to the PEP, and are "minimal" in that they only apply to the specific resource and all static attributes have already been calculated in the policies.

It will be noted that the term "comprises/comprising" as used in this description is intended to denote the presence of a given characteristic, step or component, without excluding the presence of one or more other characteristic, features, integers, steps, components or groups thereof.

Embodiments of the invention will now be described with a reference to the accompanying drawings, in which:

DETAILED DESCRIPTION OF THE PREFERRED EMBODIMENTS

Figure 1:
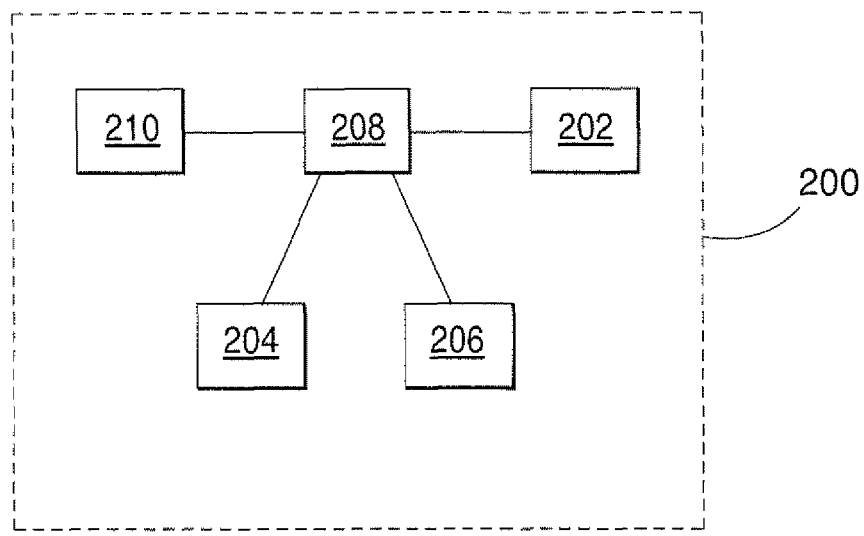
FIG. 1 is a block diagram of the XACML architecture according to prior art.

In FIG. 1 there is disclosed a block diagram of the XACML architecture 200, although simplified, according to the prior art. As stated before, XACML is an access control policy language. An attempt to access a resource 202 is described in terms of a "Request", which lists attributes of the subject 204, the resource 202, the action and the environment 206. Most kinds of "facts" about the subject 204, resource 202, action and environment 206 can be described in terms of attributes. An attribute is an identifier, a data type and a value. It can also be described as a variable with a name (the identifier), a data type and a value.

The request is constructed by a Policy Enforcement Point, PEP 208. The purpose of a PEP 208 is to guard access to a resource 202 and let only authorized users through. The PEP 208 itself does not know who is authorized, rather it submits the request to a Policy Decision Point, PDP 210, which contain policies about which requests that shall be permitted respective denied. The PDP 210 evaluates the policies, and returns a permit/deny response to the PEP 208. The PEP 208 then either lets the access proceed or stops it.

The fundamental purpose with this architecture is to establish separation of concerns, that is, to differentiate between policy decision making and policy enforcement. Enforcement is by its nature specific to a particular resource 202, while a decision engine can be made general purpose and reusable.

In general policies can be nested in a tree form. Different policies are combined using so called combining algorithms which define which policy takes precedence over another.

Figure 2:
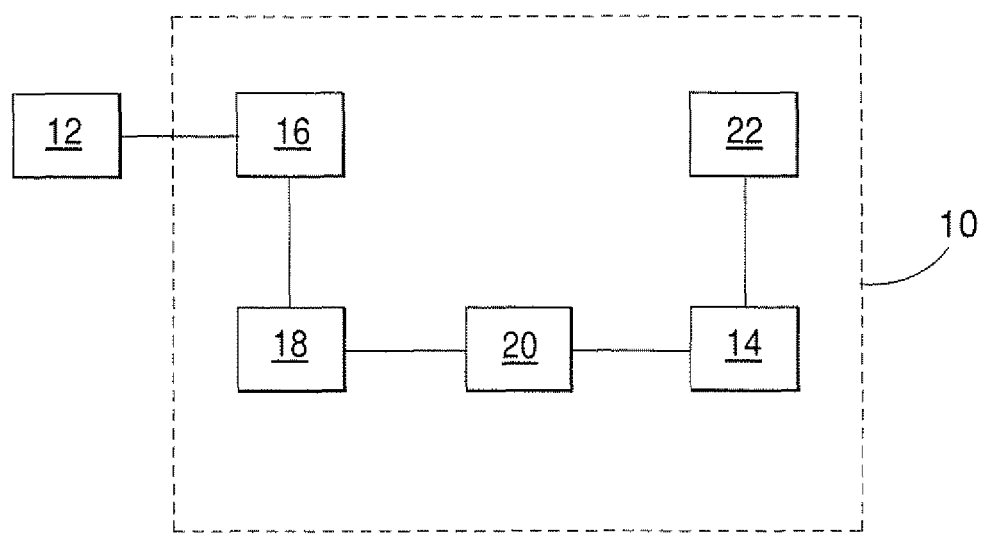
FIG. 2 is a block diagram of a system operable to control policy distribution with partial evaluation in order to permit/deny access to a protected means according to the present invention.

In FIG. 2 there is disclosed a block diagram of a system 10 operable to control policy distribution with partial evaluation in order to permit/deny access to protected means 12 according to the present invention. The system 10 comprises a storing means 14 operable to store all access control policy functions for all protected means 12. It is pointed out that for the sake of simplicity there is only disclosed one protected means 12 in FIG. 2. Furthermore, the system 10 also comprises a guard means 16 connected to the protected means 12, and operable to guard access to the protected means 12, and to construct an access control request comprising attributes regarding the protected means 12. As is apparent in FIG. 2, the system 10 also comprises a policy decision means 18 connected to the guard means 16 and operable to receive the access control request from the guard means 16. Furthermore, the system 10 comprises a policy distribution means 20 connected to the storing means 14 and to the policy decision means 18. The policy decision means 18 is in turn also operable to collect the static attributes of the protected means 12, and to send the static attributes to the policy distribution means 20. Furthermore, the policy distribution means 20 is operable to construct a partial access control request from the static attributes of the protected means 12, and to perform partial evaluation against the access control policy function stored in the storing means 14, resulting in a simplified access control policy function. The policy distribution means 20 is thereafter operable to send the simplified access control policy function to the policy decision means 18, which in turn is operable to use the simplified access control policy function to evaluate access control requests regarding the protected means 12, and to return a permit/deny response to the guard means 16.

According to a preferred embodiment of the system 10, each protected means 12 is a resource, a subject, an action, an environment, or a combination of two or more of these alternatives.

Furthermore, according to another embodiment the system 10 also comprises an input means 22 connected to the storing means 14 (see FIG. 2). The input means 22 is operable to input a new access control policy function or to amend an access control policy function in the storing means 14.

According to another preferred embodiment of the system 10, each protected means 12 is connected to the guard means 16 closest to the protected means 12. Although it is not disclosed in FIG. 2, it is pointed out that there can be several protected means 12 connected to the same guard means 16.

Furthermore, according to another alternative the storing means 14 is in the form of a database 14.

The attributes can be partitioned into attributes which are present, attributes which are not present and attributes which are undefined. Since these three sets partition the set of possible attributes, it is necessary to only define two of them and the third is implied. Typically, the set of attributes which are present and the set of undefined attributes are explicitly listed in an actual request, but this need not always to be the case.

Figure 3:
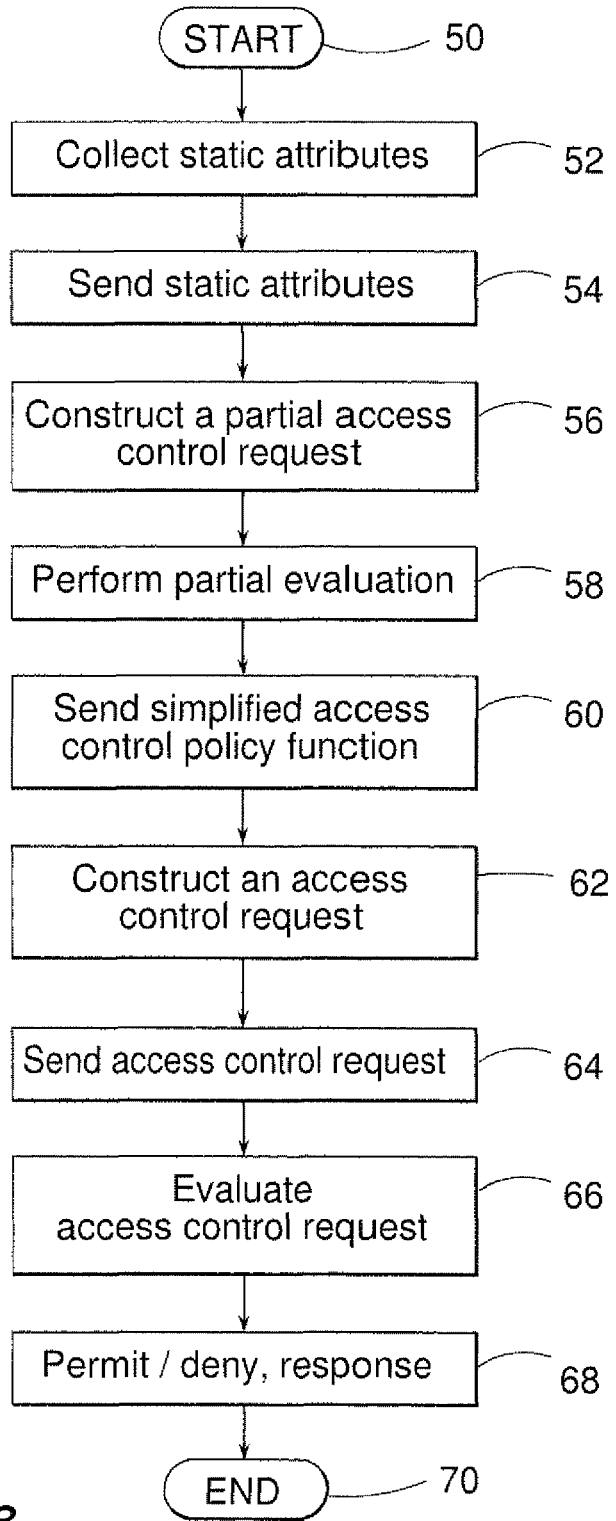
FIG. 3 is a flow chart of a method for controlling policy distribution with partial evaluation in order to permit/deny access to a protected means according to the present invention.

In FIG. 3 there is disclosed a flow chart of a method for controlling policy distribution with partial evaluation in order to permit/deny access to a protected means 12 (see FIG. 2) according to the present invention. The method begins at block 50. The method continues, at block 52, with the step: with the aid of the policy decision means 18 connected to the guard means 16, to collect the static attributes of the protected means 12. Thereafter, the method continues, at block 54, with the step: to send the static attributes to the policy distribution means 20 comprised in the system 10 and connected to the policy decision means 18, and to the storing means 14. The storing means 14 is operable to store all access control policy functions for all protected means 12. The method continues, at block 56, with the step: to construct a partial access control request from the static attributes of the protected means 12. This is performed by the policy distribution means 20. Thereafter, the method continues, at block 58, with the step: to perform partial evaluation against the access control policy function stored in the storing means 14, resulting in a simplified access control policy function. This is also performed by the policy distribution means 20. The method continues, at block 60, with the step: to send the simplified access control policy function to the policy decision means 18. This is also performed by the policy distribution means 20. Thereafter, the method continues, at block 62, with the step: with the aid of the guard means 16, to construct an access control request comprising attributes regarding the protected means 12. The method continues, at block 64, with the step: to send the access control request to the policy decision means 18. This is performed by the guard means 16. Thereafter, the method continues, at block 66, with the step: to use the simplified access control policy function to evaluate access control requests regarding the protected means 12. The method continues, at block 68, with the step: to return a permit/deny response to the guard means 16. This is performed by the policy decision means 18. The method is completed at block 70.

According to a preferred embodiment of the method, each protected means 12 is a resource, a subject, an action, an environment, or a combination of two or more of these alternatives.

According to another embodiment, the method also comprises the step: with the aid of the input means 22 comprised in the system 10 and connected to the storing means 14, to input a new access control policy function, or to amend an access control policy function in the storing means 14.

Furthermore, the attributes can be partitioned into attributes which are present, attributes which are not present and attributes which are undefined. Since these three sets partition the set of possible attributes, it is necessary to only define two of them and the third is implied. Typically, the set of attributes which are present and the set of undefined attributes are explicitly listed in an actual request, to but this need not always to be the case.

According to a preferred embodiment of the method, the step to perform partial evaluation is performed by substituting the attributes which are present in the partial access control request with values into the access control policy function.

Partial evaluation works on an access control policy language. The policy language consists of functional expressions. The access control policy is a functional expression formed by nesting the functional components of the language. At the leaf level in the functional tree, there are references to the attributes in the access control request, such that selected attributes from the access control request form the inputs to the arguments of the access control policy function.

Thus the access control policy has a form such as below.
F1(F2(F3(A1, A2, . . . ), F4(A3, A4, . . . ), F5(A5, A6, . . . ), . . . ))
where F1, F2 and so on denote functions, and A1, A2 and so on denote references to attributes in the access control request. Each function may take any number of arguments and the functions may be nested arbitrarily deep. The topmost function (F1 in this case) returns an access control decision Permit, Deny or any of a number of error or diagnostic codes. Nested functions may return any data type.

A partial request is an access control request which does not contain all the attributes which are expected in a full access control request. Partial evaluation is performed by substituting the attributes which are present in the partial request into the access control policy function and evaluating the function as far as possible. For instance, if in the above given example, A2, A5 and A6 are present in the partial request, but the other attributes are not, the function can be substituted as follows:

F1(F2(F3(A1, a2, ... ), F4(A3, A4, ... ), F5(a5, a6, ...), ... ))

where a2, a5 and a6 denote the values for the attributes A2, A5 and A6 respectively.

It may be possible to simplify the function further since given the values of some attributes, some functions may be determined regardless of the value of the other arguments. For instance, the Boolean function AND (A8, A9, A10) can be evaluated to False if it can be found that at least one of its arguments is False.

Thus, partial evaluation results in a simplified access control policy function, where parts of, or the full original access control policy function may be determined. For instance, the above given example might simplify into a new function:

F1(F2(F6(A1, A4)))

The new access control policy function will give the same result as the original to each full request, as long as the full access control request contains the attributes which were defined in the partial request.

Figure 4:
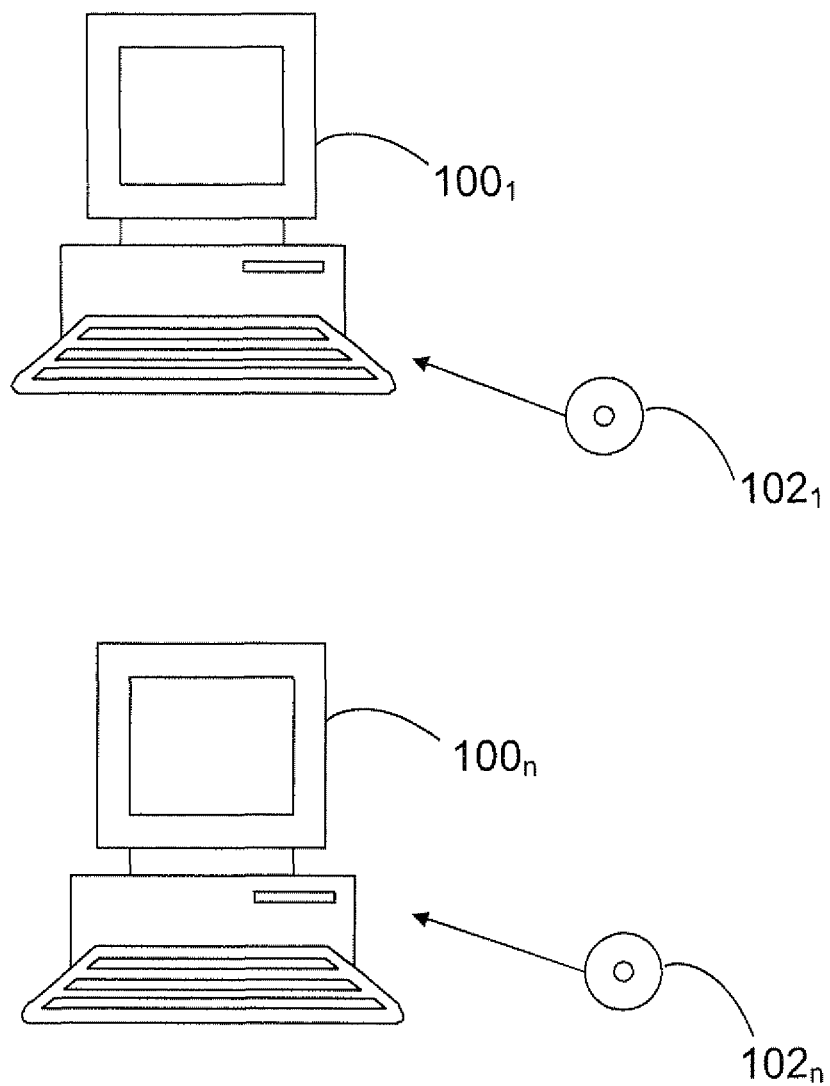
FIG. 4 schematically shows a number of compute program products according to the present invention.

In FIG. 4, some computer program products $102_1, \ldots, 102_n$ according to the present invention are schematically shown, in FIG. 4, n different digital computers $100_1, \ldots, 100_n$ are shown, where n is an integer. In FIG. 4, n different computer program products $102_1, \ldots, 102_n$ are shown, here shown in the form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for performing all the steps according to FIG. 3, when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. A computer system operable to control distribution of an access control policy to permit or deny access to one or more protected alternatives using partial evaluation, said system comprising:
    a computer including a memory,
    a database operable to store all access control policy functions for all protected alternatives,
    a guard operable to guard access to the protected alternative and to construct an access control request comprising attributes regarding the protected alternative,
    a policy decider connected to the guard and operable to receive the access control request from the guard,
    a policy distributor that is connected to the database and to the policy decider, and
    a computer program product that is loaded into the memory and that is comprised of software code portions for performing steps to control the distribution of the access control policy to permit or deny access to one or more of the protected alternatives using partial evaluation, when the product is run on the computer, whereby the computer is programmed to perform the steps of:
    receiving from the policy decider static attributes of the protected alternative at a policy distributor;
    constructing, at the policy distributor, a partial access control request from the static attributes of the protected alternative;
    performing, at the policy distributor, a partial evaluation against the access control policy function stored in the database by substituting the static attributes of the protected alternative, which are present in the partial control request, into the access control policy function, so as to generate a simplified access control policy function; and
    sending, from the policy distributor, the simplified access control policy function from the policy distributor to the policy decider, thereby enabling the policy decider to use the simplified access control policy function to evaluate access control requests regarding the protected alternative, and to return a permit or deny response to the guard, and
    wherein each protected alternative is a resource, a subject, an action, an environment, or a combination of two or more of these alternatives.

2. The system according to claim 1, wherein said system also comprises an input connected to the database, and operable to input a new access control policy function or to amend an access control policy function in the database.

3. The system according to claim 1, wherein the protected alternative is connected to the guard closest to the protected alternative.

4. The system according to claim 1, wherein the attributes are in the form of attributes which are present, attributes which are not present and attributes which are undefined.

5. A method for controlling, with the aid of a computer system, distribution of an access control policy to permit or deny access to one or more protected alternatives using partial evaluation, the computer system comprising a database, a guard, a policy decider and a policy distributor, the computer system being programmed to perform the method comprising the steps of:
    receiving from a policy decider connected to a guard static attributes of the protected alternative at a policy distributor which is connected to the policy decider and to a database comprised in the system and which is operable to store all access control policy functions for all protected alternatives;
    constructing, at the policy distributor, a partial access control request from the static attributes of the protected alternative;
    performing, at the policy distributor, a partial evaluation against the access control policy function stored in the database by substituting the static attributes of the protected alternative, which are present in the partial control request, into the access control policy function, so as to generate a simplified access control policy function; and
    sending the simplified access control policy function from the policy distributor to the policy decider, and
    wherein each protected alternative is a resource, a subject, an action, an environment, or a combination of two or more of these alternatives.

6. The method according to claim 5, wherein said method further comprises the step of:
    with the aid of an input further comprising the system and connected to the database, inputting a new access control policy function, or amending an access control policy function in the database.

7. The method according to claim 5, wherein the attributes are in the form of attributes which are present, attributes which are not present and attributes which are undefined.

8. The method according to claim 5, wherein the step of performing the partial evaluation is performed by substituting the attributes which are present in the partial access control request with values into the access control policy function.

9. A non-transitory computer readable storage medium containing at least one computer program product, which is directly loadable into the internal memory of at least one digital computer, and which comprises software code portions for performing, when the at least one product is/are run on the at least one computer, a method for controlling distribution of an access control policy to permit or deny access to one or more protected alternatives using partial evaluation, the method comprising the steps of:
receiving from a policy decider, which is connected to a guard, static attributes of the protected alternative at a policy distributor which is connected to the policy decider and to a database comprised in at least one computer and which is operable to store all access control policy functions for all protected alternatives;
constructing, at the policy distributor, a partial access control request from the static attributes of the protected alternative;
performing, at the policy distributor, a partial evaluation against the access control policy function stored in the database by substituting the static attributes of the protected alternative, which are present in the partial control request, into the access control policy function, so as to generate a simplified access control policy function; and
sending the simplified access control policy function from the policy distributor to the policy decider, and
wherein each protected alternative is a resource, a subject, an action, an environment, or a combination of two or more of these alternatives.

10. The method according to claim 5, wherein the computer system is further programmed to perform the method further comprising the steps of:
with the aid of the guard, constructing an access control request comprising attributes regarding the protected alternative;
sending the access control request to the policy decider;
using the simplified access control policy function to evaluate access control requests regarding the protected alternative; and
returning a permit or deny response to the guard.

11. The system according to claim 1, wherein the guard is a Policy Enforcement Point (PEP).

12. The system according to claim 1, wherein the policy decider is a Policy Decision Point (PDP).

* * * * *